(12) United States Patent
Park

(10) Patent No.: US 9,590,219 B2
(45) Date of Patent: Mar. 7, 2017

(54) ELECTRODE ASSEMBLY AND SECONDARY BATTERY HAVING THE SAME

(71) Applicant: SAMSUNG SDI CO., LTD., Yongin-si, Gyeonggi-do (KR)

(72) Inventor: Su-Hyung Park, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 224 days.

(21) Appl. No.: 14/598,711

(22) Filed: Jan. 16, 2015

(65) Prior Publication Data
US 2015/0214527 A1   Jul. 30, 2015

(30) Foreign Application Priority Data

Jan. 24, 2014 (KR) .................. 10-2014-0008782

(51) Int. Cl.
| | | |
|---|---|---|
| *H01M 2/16* | (2006.01) | |
| *H01M 10/04* | (2006.01) | |
| *H01M 2/18* | (2006.01) | |
| *H01M 2/26* | (2006.01) | |
| H01M 4/13 | (2010.01) | |
| H01M 10/052 | (2010.01) | |
| H01M 10/0583 | (2010.01) | |

(52) U.S. Cl.
CPC ........... *H01M 2/1673* (2013.01); *H01M 2/18* (2013.01); *H01M 2/26* (2013.01); *H01M 10/0431* (2013.01); *H01M 4/13* (2013.01); *H01M 10/052* (2013.01); *H01M 10/0583* (2013.01)

(58) Field of Classification Search
CPC .. H01M 2/1673; H01M 10/0431; H01M 2/18; H01M 2/26; H01M 4/13; H01M 10/052; H01M 10/0583; H01M 10/0587
See application file for complete search history.

(56) References Cited

U.S. PATENT DOCUMENTS

| | | |
|---|---|---|
| 2011/0104541 A1 | 5/2011 | Ahn et al. |
| 2012/0183825 A1 | 7/2012 | Lee et al. |
| 2012/0208055 A1* | 8/2012 | Ahn ..................... H01M 2/263 429/94 |

FOREIGN PATENT DOCUMENTS

| | | |
|---|---|---|
| JP | 2001-243985 A | 9/2013 |
| KR | 2011-0048131 A | 5/2011 |
| KR | 2012-0082808 A | 7/2012 |

* cited by examiner

*Primary Examiner* — Jonathan G Leong
*Assistant Examiner* — Seenam Agbetiafan
(74) *Attorney, Agent, or Firm* — Lee & Morse, P.C.

(57) ABSTRACT

An electrode assembly and a secondary battery including the same, the electrode assembly including a first electrode plate, the first electrode plate including a first electrode collector on which a first active material is coated, and a first electrode tab protruding in parallel with a lengthwise direction of the first electrode collector; a second electrode plate, the second electrode plate including a second electrode collector on which a second active material is coated, and a second electrode tab protruding in parallel with a lengthwise direction of the second electrode collector; a first separator between the first and second electrode plates; and a second separator at an outside of the second electrode plate, wherein the first and second electrode tabs protrude in directions opposite to each other perpendicular to a winding axis.

20 Claims, 10 Drawing Sheets

ELECTRODE ASSEMBLY AND SECONDARY BATTERY HAVING THE SAME

CROSS-REFERENCE TO RELATED APPLICATION

Korean Patent Application No. 10-2014-0008782, filed on Jan. 24, 2014, in the Korean Intellectual Property Office, and entitled: "Electrode Assembly and Secondary Battery Having the Same," is incorporated by reference herein in its entirety.

BACKGROUND

1. Field

Embodiments relate to an electrode assembly and a secondary battery having the same.

2. Description of the Related Art

Technological development and increased demand for mobile devices have led to a rapid increase in the demand for secondary batteries as energy sources. Among these secondary batteries, lithium secondary batteries, having high energy density and voltage, long life span, and low self-discharge, are commercially available and widely used.

SUMMARY

Embodiments are directed to an electrode assembly and a secondary battery having the same.

The embodiments may be realized by providing an electrode assembly including a first electrode plate, the first electrode plate including a first electrode collector on which a first active material is coated, and a first electrode tab protruding in parallel with a lengthwise direction of the first electrode collector; a second electrode plate, the second electrode plate including a second electrode collector on which a second active material is coated, and a second electrode tab protruding in parallel with a lengthwise direction of the second electrode collector; a first separator between the first and second electrode plates; and a second separator at an outside of the second electrode plate, wherein the first and second electrode tabs protrude in directions opposite to each other perpendicular to a winding axis.

A length of the first electrode plate may be different from a length of the second electrode plate.

A winding amount of the first electrode plate may be greater by a half cycle than that of the second electrode plate.

A length of the first separator may be different from a length of the second separator.

A winding amount of the first separator may be greater by a half cycle than that of the second separator.

The winding amount of the first electrode plate may be about equal to that of the first separator, and the winding amount of the second electrode plate may be about equal to that of the second separator.

The first electrode collector may include a first active material portion that is an area of the first electrode collector where the first active material is coated, and a first non-coating portion that is a remaining area of the first electrode collector other than the first active material portion, and the second electrode collector may include a second active material portion that is an area of the second electrode collector where the second active material is coated, and a second non-coating portion that is a remaining area of the second electrode collector other than the second active material portion.

Lengths of the first and second electrode plates may be about equal to each other.

A winding end of an outermost electrode plate of the first and second electrode plates may be folded back in a direction opposite to a winding direction.

The embodiments may be realized by providing a secondary battery including an electrode assembly; and a battery case accommodating the electrode assembly therein, wherein the electrode assembly includes a first electrode plate, the first electrode plate including a first electrode collector on which a first active material is coated, and a first electrode tab protruding in parallel with a lengthwise direction of the first electrode collector; a second electrode plate, the second electrode plate including a second electrode collector on which a second active material is coated, and a second electrode tab protruding in parallel with a lengthwise direction of the second electrode collector; a first separator between the first and second electrode plates; and a second separator at an outside of the second electrode plate, and wherein the first and second electrode tabs protrude in directions opposite to each other perpendicular to a winding axis.

A length of the first electrode plate may be different from a length of the second electrode plate.

A winding amount of the first electrode plate may be greater by a half cycle than that of the second electrode plate.

A length of the first separator may be different from a length of the second separator.

A winding amount of the first separator may be greater by a half cycle than that of the second separator.

The winding amount of the first electrode plate may be about equal to that of the first separator, and the winding amount of the second electrode plate may be about equal to that of the second separator.

The first electrode collector may include a first active material portion that is an area of the first electrode collector where the first active material is coated, and a first non-coating portion that is a remaining area of the first electrode collector other than the first active material portion, and the second electrode collector may include a second active material portion that is an area of the first electrode collector where the second active material is coated, and a second non-coating portion that is a remaining area of the first electrode collector other than the second active material portion.

Lengths of the first and second electrode plates may be about equal to each other.

A winding end of an outermost electrode plate of the first and second electrode plates may be folded back in a direction opposite to a winding direction.

A section of the electrode assembly that is perpendicular to the winding axis of the electrode assembly may have a bent surface.

The battery case may include an electrode assembly accommodating portion that accommodates the electrode assembly therein; an accommodating portion cover that covers the electrode assembly accommodating portion; and a bonding portion that is bent at an upper end of the electrode assembly accommodating portion, the bonding portion being bonded to the accommodating portion cover.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
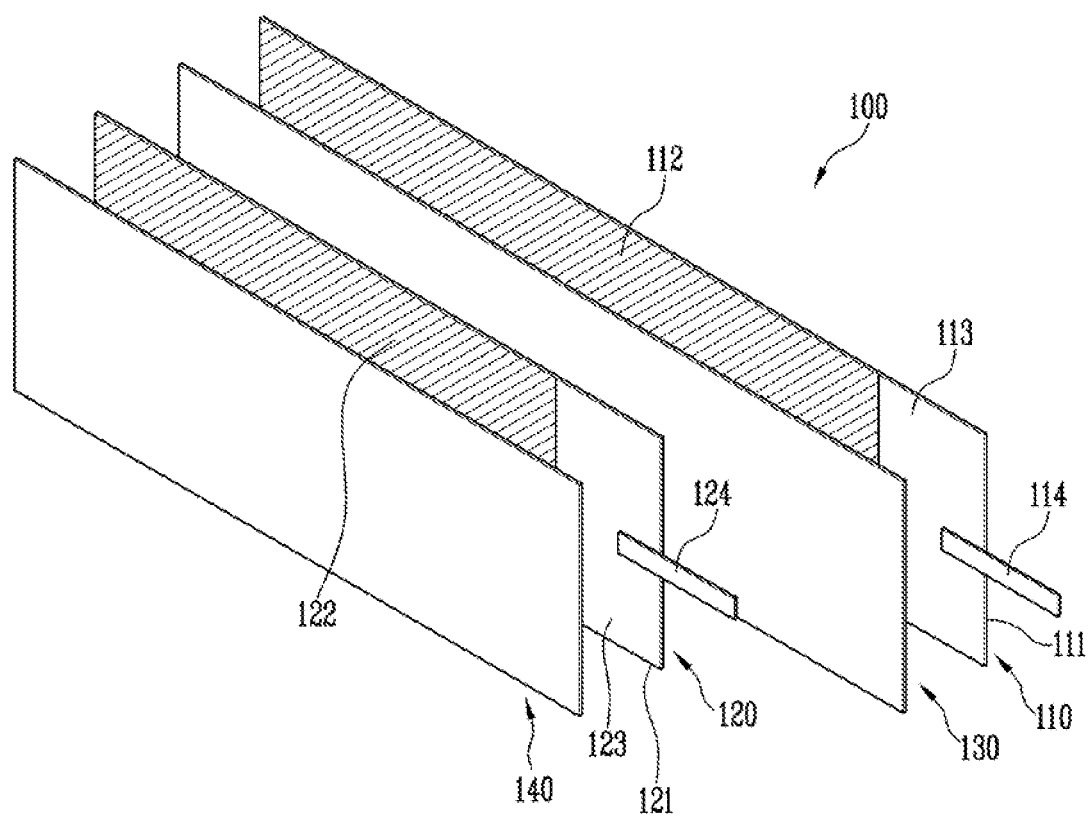
FIG. 1 illustrates an exploded perspective view of an electrode assembly according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
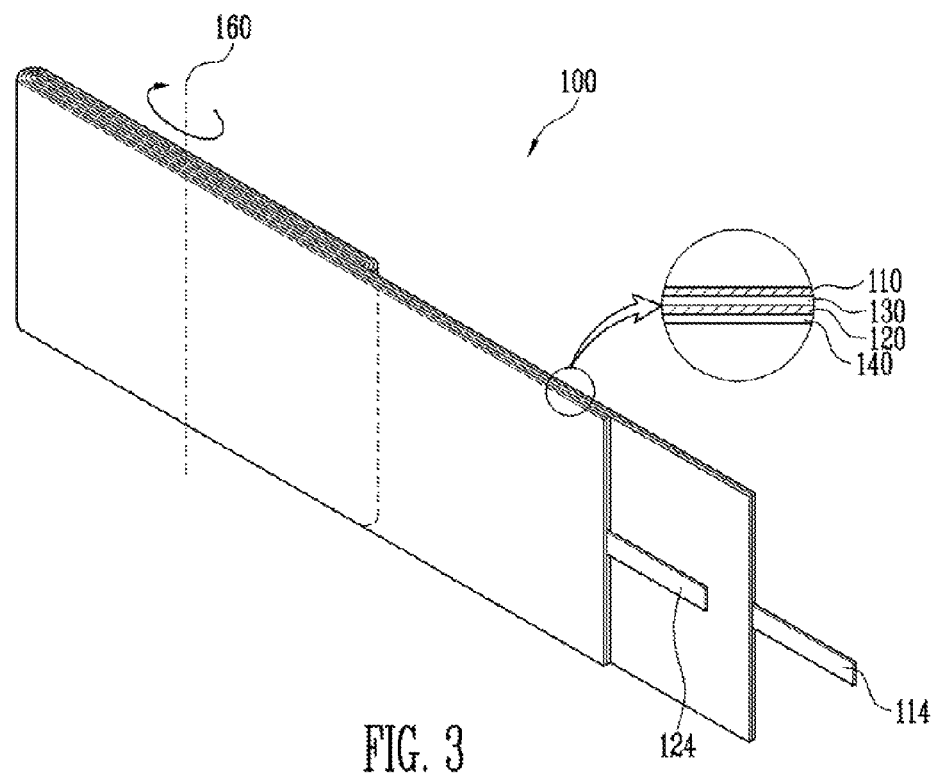
FIG. 2 illustrates a conceptual view of a winding method of the electrode assembly shown in FIG. 1.
Figure 3:
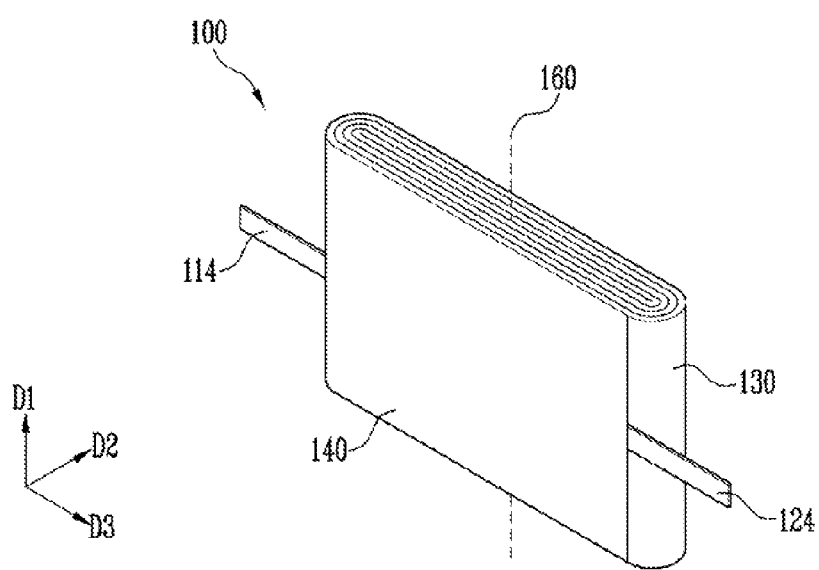
FIG. 3 illustrates a perspective view of a state after the electrode assembly shown in FIG. 1 is wound.
Figure 4:
FIG. 4 illustrates a side view of the electrode assembly shown in FIG. 3.
Figure 5:
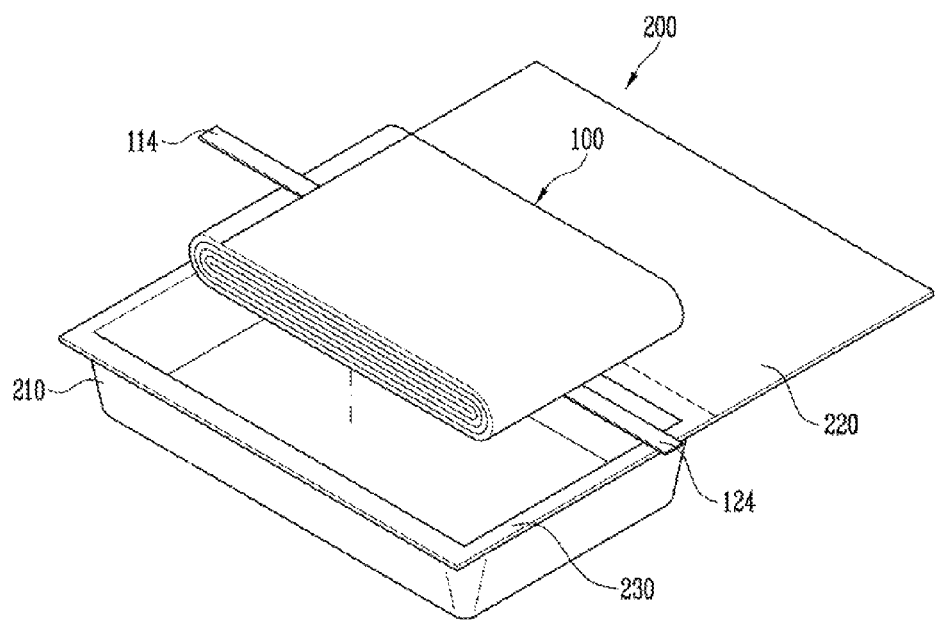
FIG. 5 illustrates an exploded perspective view of a secondary battery having the electrode assembly shown in FIG. 3.
Figure 6:
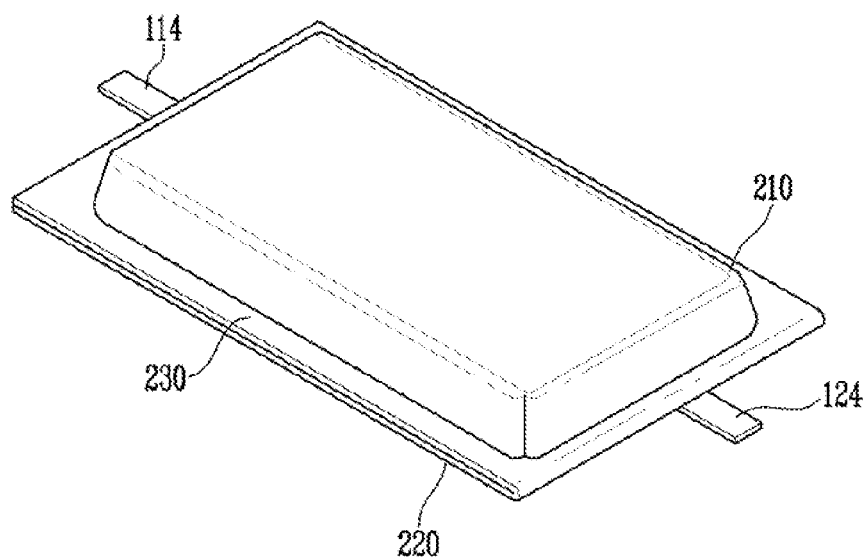
FIG. 6 illustrates a perspective view of the secondary battery before having a bent shape.
Figure 7:
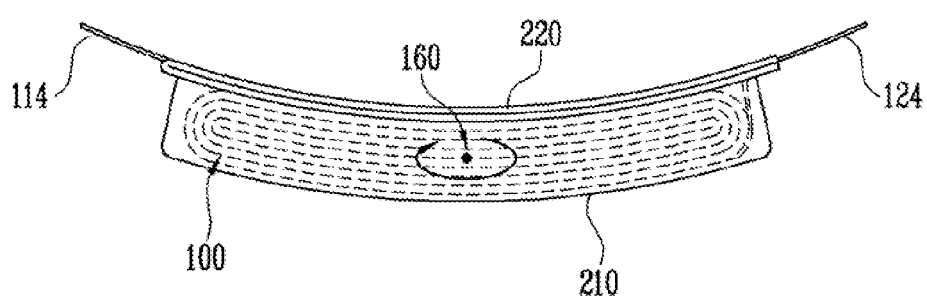
FIGS. 7 and 8 illustrate sectional views of the bent shape of the secondary battery shown in FIG. 6.
Figure 8:
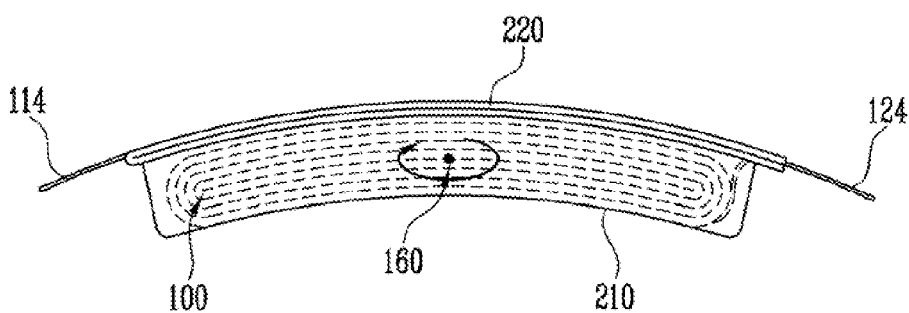

FIG. 1 illustrates an exploded perspective view of an electrode assembly according to an embodiment. FIG. 2 illustrates a conceptual view of a winding method of the electrode assembly shown in FIG. 1. FIG. 3 illustrates a perspective view of a state after the electrode assembly shown in FIG. 1 is wound. FIG. 4 illustrates a side view of the electrode assembly shown in FIG. 3. FIG. 5 illustrates an exploded perspective view of a secondary battery having the electrode assembly shown in FIG. 3. FIG. 6 illustrates a perspective view of the secondary battery before having a bent shape. FIGS. 7 and 8 illustrate sectional views of the bent shape of the secondary battery shown in FIG. 6.

Referring to FIGS. 1 to 8, the secondary battery may include an electrode assembly 100 and a battery case 200.

The electrode assembly 100 may be accommodated together with an electrolyte (not shown) in the battery case 200.

The electrode assembly 100 may include a first electrode plate 110, a second electrode plate 120, a first separator 130, and a second separator 140. In an implementation, one of the first and second electrode plates 110 and 120 may be a positive electrode plate, and the other of the first and second electrode plates 110 and 120 may be a negative electrode plate. For example, the first and second electrode plates 110 and 120 may have polarities that are opposite from one another. In the present embodiment, the first electrode plate 110 being a positive electrode plate and the second electrode plate 120 being a negative electrode plate will be described as an example.

The first electrode plate 110 may include a first electrode collector 111 (on which a first active material is coated), and a first electrode tab 114 (protruding in parallel with a lengthwise direction of the first electrode collector 111).

The first electrode collector 111 may be a conductive material plate, e.g., a material plate made of one of aluminum, nickel, titanium, or plastic carbon. For example, the first electrode collector 111 may be made of a suitable material having high conductivity, and that does not cause a chemical change.

The first electrode collector 111 may include a first active material portion 112 (e.g., an area of the first electrode collector 111 where the first active material is coated), and a first non-coating portion 113 (e.g., a remaining area of the first electrode collector 111 except for or other than the first active material portion 112).

The first active material may include a positive electrode active material, e.g., a layered compound containing lithium, a conductive material (for improving conductivity), and a binder (for improving bonding force between the positive electrode active material and the conductive material). In an implementation, the first active material portion 112 may be formed by mixing the positive electrode active material, the conductive material, and the binder with a solvent to prepare a mixture in the form of a slurry, and then coating the slurry on a surface of the first electrode collector 111.

The first electrode tab 114 may be electrically connected directly to an outside, or be electrically connected to the outside through a separate electrode lead (not shown). The first electrode tab 114 may protrude from the first non-coating portion 113 in a direction parallel with the lengthwise direction of the first electrode collector 111. The first electrode tab 114 may be attached to the first non-coating portion 113 through one or more of, e.g., ultrasonic welding, resistance welding, or laser welding. The first electrode tab 114 may be formed of one of, e.g., nickel or aluminum. In an implementation, the first electrode tab 114 may be integrally formed with the first electrode collector 111.

The first electrode tab 114 may be exposed to an outside of the battery case 200.

In an implementation, the first electrode tab 114 may be disposed at a center of the first non-coating portion 113. In an implementation, an attachment position of the first electrode tab 114 to the first non-coating portion 113 may be changed as desired.

The second electrode plate 120 may include a second electrode collector 121 (on which a second active material is coated), and a second electrode tab 124 (protruding in parallel with a lengthwise direction of the second electrode collector 121).

The second electrode collector 121 may be a conductive metal plate, e.g., a metal plate made of one of copper, stainless steel, aluminum, or nickel.

The second electrode collector 121 may include a second active material portion 122 (e.g., an area of second electrode collector 121 where the second active material is coated), and a second non-coating portion 123 (e.g., a remaining area of the second electrode collector 121 except for or other than the second active material portion 122).

The second active material may include a negative active material and a binder (for improving the bonding force of the negative active material). In an implementation, the second active material portion 122 may be formed by mixing the negative active material and the binder with a solvent to prepare a mixture in the form of a slurry, and then coating the slurry on a surface of the second electrode collector 121.

The second electrode tab 124 may be electrically connected directly to an outside, or be electrically connected to the outside through a separate electrode lead (not shown). The second electrode tab 124 may protrude from the second non-coating portion 123 in a direction parallel with the lengthwise direction of the second electrode collector 121. The second electrode tab 124 may be attached to the second non-coating portion 123 through one or more of, e.g., ultrasonic welding, resistance welding, or laser welding. The second electrode tab 124 may be formed of one of, e.g., copper, nickel, or aluminum. In an implementation, the second electrode tab 124 may be integrally formed with the second electrode collector 121.

The second electrode tab 124 may be exposed to the outside of the battery case 200. For example, the second electrode tab 124 may be exposed in a direction opposite to the first electrode tab 114. In an implementation, the second electrode tab 124 may protrude from an opposite side of the electrode assembly 100 relative to the first electrode tab 114.

In an implementation, the second electrode tab 124 may be disposed at a center of the second non-coating portion 123. In an implementation, an attachment position of the second electrode tab 124 to the second non-coating portion 123 may be changed as desired.

One of the first and second separators 130 and 140, e.g., the first separator 130, may be between the first and second electrode plates 110 and 120. The other of the first and second separators 130 and 140 may be at an outside of the first and second electrode plates 110 and 120. For example, the second separator 140 may be disposed at the outside of the second electrode plate 120.

The first or second separator 130 or 140 may be an insulating thin film having high ion transmittance and mechanical strength. For example, the first or second separator 130 or 140 may include a plurality of fine through-holes, and may be a thin film made of one of polyethylene (PE), polypropylene (PP) and polyvinylidene fluoride (PVdF). Thus, the first or second separator 130 may serves as a path for ions and simultaneously may help prevent contact between the first and second electrode plates 110 and 120.

The electrode assembly 100 may be manufactured by winding the first electrode plate 110, the first separator 130, the second electrode plate 120, and the second separator 140 (with a predetermined width) about a winding axis 160. As shown in FIGS. 7 and 8, a section of the electrode assembly 100 (e.g., taken perpendicular to the winding axis 160) may have a bent shape.

The winding axis 160, as shown in FIG. 3, may extend in a first direction D1.

The first direction D1 may correspond with a widthwise direction of the electrode assembly 100. The electrode assembly 100 may have a thickness in a second direction D2 that is perpendicular to the first direction D1.

The electrode assembly 100 may have a length in a third direction D3 that is perpendicular to the first and second directions D1 and D2.

The first and second electrode tabs 114 and 124 (of the first and second electrode plates 110 and 120) may be respectively exposed to outsides through outermost edges of the electrode assembly 100, and may extend in parallel with a wound direction of the electrode assembly 100, e.g., the third direction D3.

The first and second electrode tabs 114 and 124 may protrude in the opposite directions relative to each other. For example, the first and second electrode tabs 114 and 124 may protrude from opposite sides of the electrode assembly 100.

Lengths of the first and second electrode plates 110 and 120 may be different from each other. Thus, the first and second electrode tabs 114 and 124 may protrude in the opposite directions relative to each other. For example, a length of the first electrode plate 110 may be longer than that of the second electrode plate 120. In an implementation, a winding amount of the first electrode plate 110 may be greater by a half cycle, relative to a winding amount of the second electrode plate 120. For example, the first electrode plate 110 may continue to be wound around another half turn, after the second electrode plate 120 can no longer be wound.

Lengths of the first and second separators 130 and 140 may be different from each other. For example, a length of the first separator 130 may be longer than that of the second separator 140. In an implementation, a winding amount of the first separator 130 may be greater by a half cycle, relative to a winding amount of the second separator 140. For example, the first separator 130 may continue to be wound around another half turn, after the second separator 140 can no longer be wound.

The winding amount of the first separator 130 may be substantially equal or about equal to that of the first electrode plate 110, and the winding amount of the second separator 140 may be substantially equal or about equal to that of the second electrode plate 120.

The battery case 200 may be one of, e.g., a cylindrical can, a hexahedral can, or a pouch, according to the shape of the secondary battery. In the present embodiment, the battery case 200 being a pouch will be described as an example. For example, the secondary battery of the present embodiment may be a pouch-type secondary battery.

The battery case 200 may include an electrode assembly accommodating portion 210 (that provides a space in which the electrode assembly 100 is to be accommodated), an accommodating portion cover 220 (that covers the electrode assembly accommodating portion 210), and a bonding portion 230 (that is bent at an upper end of the electrode assembly accommodating portion 210), the bonding portion 230 being bonded to the accommodating portion cover 220. The battery case 200 may be sealed by thermally bonding the accommodating portion cover 220 and the bonding portion 230 to each other.

The electrolyte may be accommodated together with the electrode assembly 100 in the battery case 200. The electrolyte may include an organic solvent, a lithium salt (e.g., $LiPF_6$, $LiBF_4$, or the like), and an additive. For example, the electrolyte may be a solution in which the additive is dissolved in the organic solvent. The organic solvent may dissolve a sufficient amount of the lithium salt, and may have a low viscosity. For example, the organic solvent may be inactive on or inert to the surfaces of the first and second electrode plates 110 and 120 in a charging/discharging process of the secondary battery. For example, the organic solvent may include at least one selected from ethylene carbonate (EC), propylene carbonate (PC), dimethyl carbonate (DMC), diethyl carbonate (DEC), or ethyl methyl carbonate (EMC).

The electrolyte may be in the form of, e.g., a polymer gel as a solid electrolyte. The polymer gel electrolyte may have a high boiling point, and hence may be stable against combustion. Thus, it is possible to help prevent the electrolyte from leaking to the outside of the battery case 200. The polymer gel may include at least one of, e.g., polyethylene glycol (PEG), polyacrylonitrile (PAN), polymethylmethacrylate (PMMA), or polyvinylidene fluoride (PVDF).

The polymer gel may be formed by a gelation reaction of a precursor of polymer. The precursor means a prepolymer. For example, the polymer gel may be formed by accommodating the precursor in the battery case 200 and heating the battery case 200 in which the precursor is accommodated.

Therefore, when the polymer gel is used as the electrolyte, the battery case 200 (in which the electrode assembly 100 and the electrolyte are accommodated) may be preferably bent in a direction parallel with the winding direction of the electrode assembly 100, and a heating process may then be performed on the battery case 200.

When the battery case is a hexahedral type can, the hexahedral can may then have a bent shape, corresponding to the bent shape of the electrode assembly 100.

As shown in FIGS. 7 and 8, the secondary battery may be in a bent state according to the shape of an electronic device to which the secondary battery supplies power. For example, the secondary battery may have a shape in which end portions of the section of the secondary battery (perpendicular to the winding axis 160) are gently bent in the same direction about a central portion of the section of the secondary battery. For example, as shown in FIG. 7, the end portions may be bent upwardly, based on the horizontal plane with respect to the central portion. Alternatively, as shown in FIG. 8, the end portions may be bent downwardly, based on the horizontal plane with respect to the central portion.

The electrode assembly 100 of the secondary battery according to the present embodiment may be electrically stable, as compared with an electrode assembly provided in a secondary battery of which section parallel to the winding axis 160 has a bent shape.

For example, in the secondary battery of which section parallel to the winding axis 160 has a bent shape, stress caused by the bending may be applied to the electrode assembly. For example, positive and negative electrode plates of the electrode assembly may be deformed. For example, wrinkles may occur in the positive and negative electrode plates. A short circuit may occur in the electrode assembly due to the deformation of the positive and negative electrode plates. Therefore, the electrode assembly may be electrically unstable. Accordingly, the secondary battery (of which section parallel to the winding axis 160 has the bent shape) may explode during a charging/discharging process thereof.

The section of the secondary battery according to the present embodiment, e.g., which may be perpendicular to the winding axis 160, may have a bent shape. In the secondary battery according to the present embodiment, stress caused by the bending may not be applied to the electrode assembly 100. Thus, the electrode assembly 100 can be electrically stable. Accordingly, although the secondary battery may have the bent shape, it is possible to help prevent the secondary battery from exploding during the charging/discharging process thereof.

Hereinafter, a manufacturing method of the secondary battery will be described with reference to FIGS. 9 to 13. FIGS. 9 to 13 illustrate views showing stages in a manufacturing method of the secondary battery shown in FIGS. 1 to 8.

Figure 9:
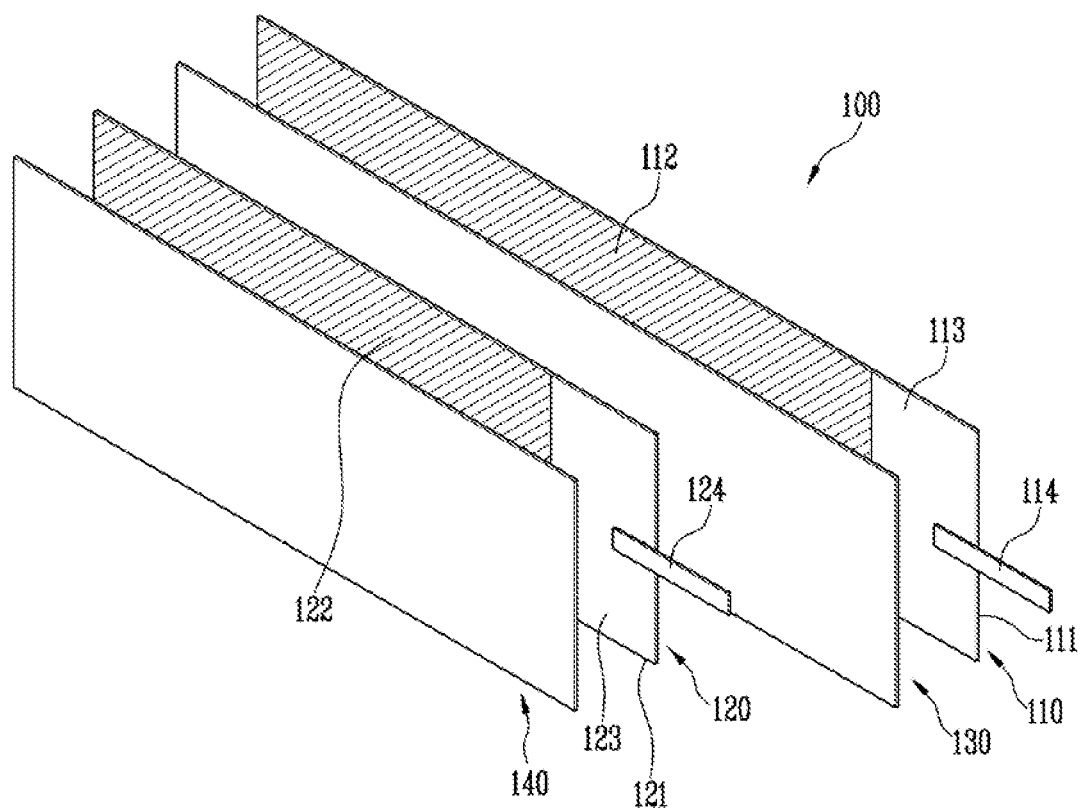
FIGS. 9 to 13 illustrate views showing stages in a manufacturing method of the secondary battery shown in FIGS. 1 to 8.

First, referring to FIG. 9, a first electrode plate 110, a first separator 130, a second electrode plate 120, and a second separator 140 may be sequentially disposed.

The first electrode plate 110 may include a first electrode collector 111 (on which a first active material is coated), and a first electrode tab 114 (protruding in parallel with the lengthwise direction of the first electrode collector 111). In an implementation, the first electrode collector 111 may include a first active material portion 112 (e.g., an area where the first active material is coated), and a first non-coating portion 113 (e.g., a remaining area of the first electrode collector 111 except for or other than the area that includes the first active material portion 112).

The second electrode plate 120 may include a second electrode collector 121 (on which a second active material is coated), and a second electrode tab 124 (protruding in parallel with the lengthwise direction of the second electrode collector 121). In an implementation, the second electrode collector 121 may include a second active material portion 122 (e.g., an area where the second active material is coated), and a second non-coating portion 123 (e.g., a remaining area of the second electrode collector 121 except for or other than the area that includes the second active material portion 122).

The first and second electrode tabs 114 and 124 may protrude in parallel with the lengthwise directions of the first and second electrode collectors 111 and 121, respectively.

Figure 10:
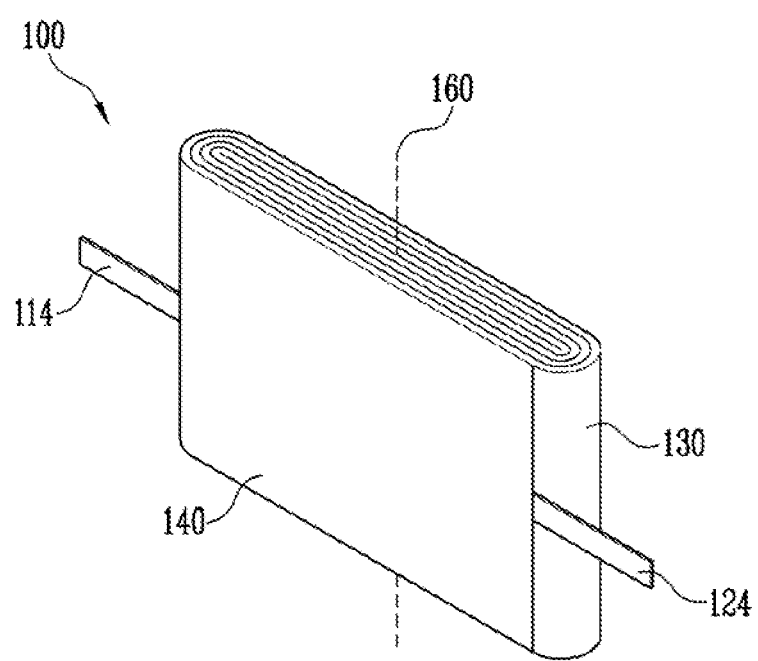

Referring to FIG. 10, the electrode assembly 100 may be formed by winding the first electrode plate 110, the first separator 130, the second electrode plate 120, and the second separator 140 (e.g., about the winding axis 160).

In the electrode assembly 100, the first and second electrode tabs 114 and 124 may protrude in directions opposite to each other.

Lengths of the first and second electrode plates 110 and 120 may be different from each other. For example, the length of the first electrode plate 110 may be longer than that of the second electrode plate 120. In an implementation, a winding amount of the first electrode plate 110 may be greater by a half cycle, relative to that of the second electrode plate 120.

Lengths of the first and second separators 130 and 140 may be different from each other. For example, the length of the first separator 130 may be longer than that of the second separator 140. In an implementation, a winding amount of the first separator 130 may be greater by a half cycle, relative to that of the second separator 140.

The winding amount of the first separator 130 may be substantially equal or about equal to that of the first electrode plate 110, and the winding amount of the second separator 140 may be substantially equal or about equal to that of the second electrode plate 120.

Figure 11:
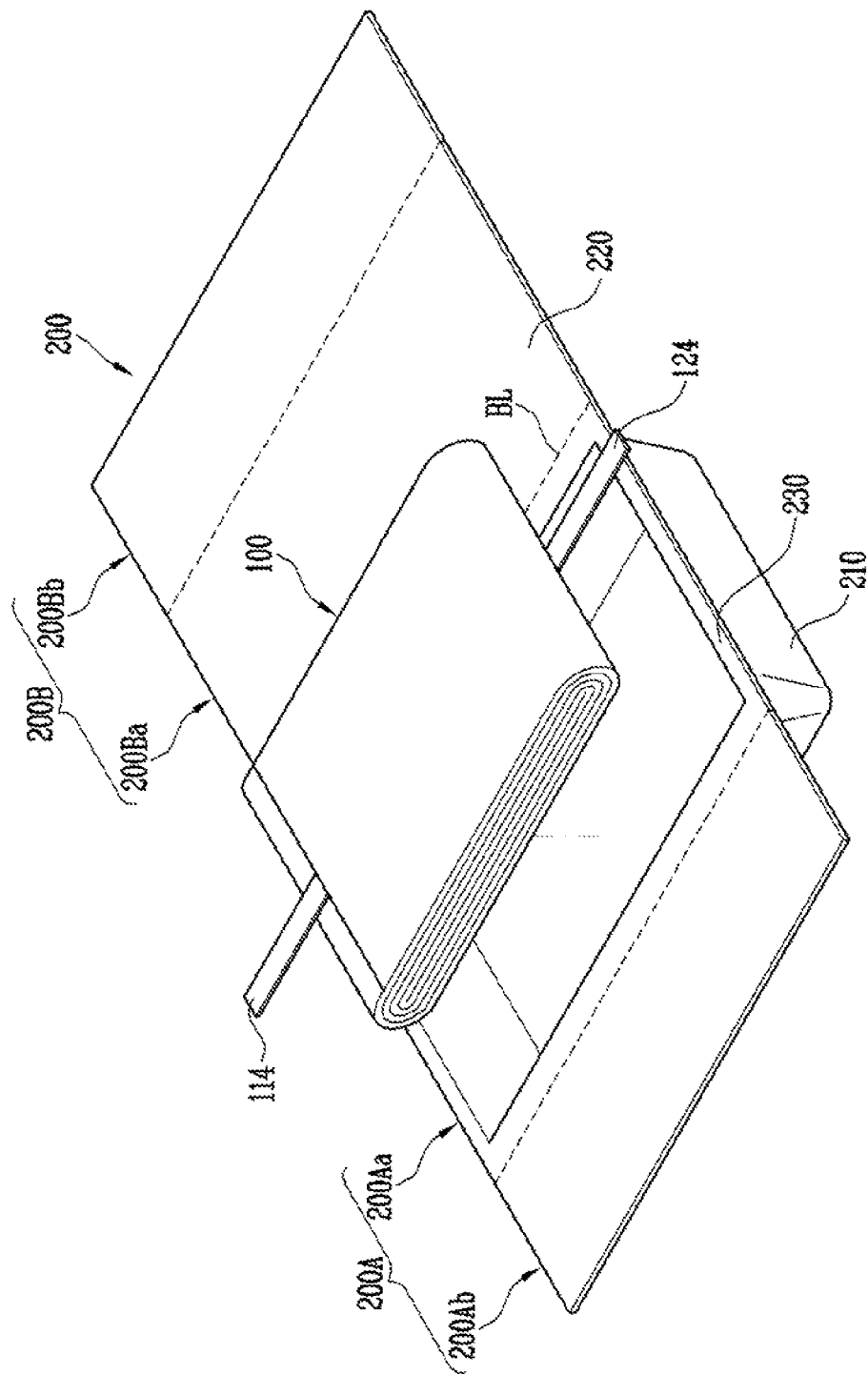

Referring to FIG. 11, a battery case 200 having the electrode assembly 100 accommodated therein may be prepared.

The battery case 200 may include first and second surfaces 200A and 200B at sides of a boundary line BL. Thus, if the battery case 200 is folded at the boundary line BL, the first and second surfaces 200A and 200B may correspond to or overlie each other.

The first surface 200A may include a first area 200Aa (having an electrode assembly accommodating portion 210), and a second area 200Ab (at an opposite side of the second surface 200B with respect to the first area 200Aa). The second surface 200B may include a third area 200Ba (adjacent to the first area 200Aa), and a fourth area 200Bb (at an opposite side of the first surface 200A with respect to third area 200Ba).

Thus, if the battery case 200 is folded at the boundary line BL, the first area 200Aa may correspond to or overlie the third area 200Ba, and the second area 200Ab may correspond to the or overlie fourth area 200Bb. In an implementation, the portion of the first area 200Aa that contacts the third area 200Ba may become a bonding portion 230.

After the battery case 200 is prepared, the electrode assembly 100 may be accommodated (together with an electrolyte) in the electrode assembly accommodating portion 210. In an implementation, the electrolyte may be a solution in which a lithium salt (e.g., $LiPF_6$, $LiBF_4$, or the like) and an additive are dissolved in an organic solvent. The organic solvent may dissolve a sufficient amount of the lithium salt, and may have a low viscosity. The electrolyte may be in the form of a polymer gel as a solid electrolyte.

The first and second electrode tabs 114 and 124 of the electrode assembly 100 may be disposed or may protrude in parallel with the boundary line BL.

Figure 12:
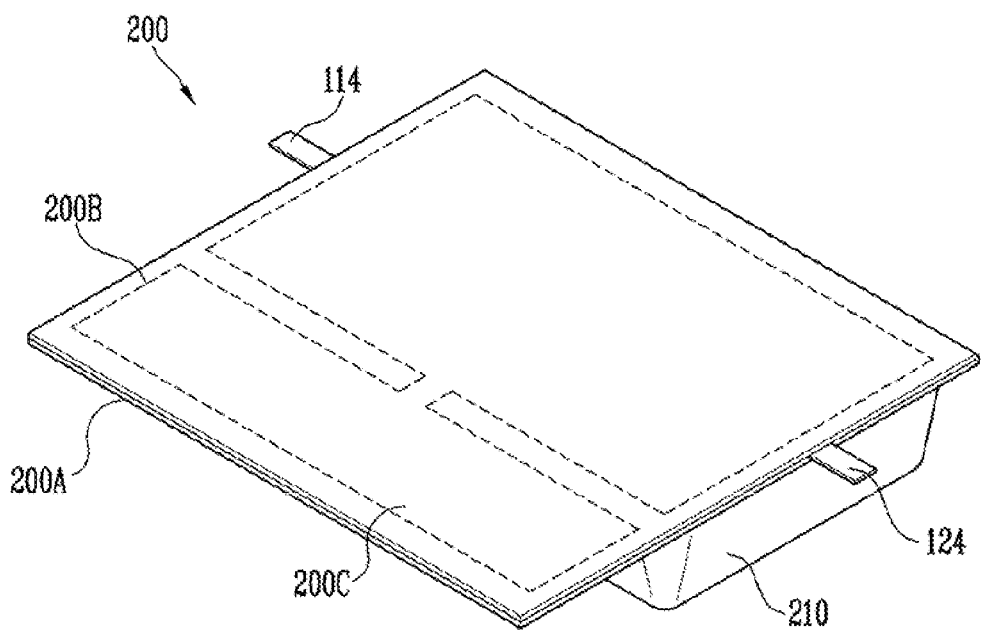

Referring to FIG. 12, after the electrode assembly 100 and the electrolyte are accommodated in the battery case 200, the battery case 200 may be folded at or about the boundary line BL, and a first thermal bonding process may be performed on edge portions of the first and second surfaces 200A and 200B. The first thermal bonding process may be performed at the portion where the second and fourth areas 200Ab and 200Bb contact each other, except at a portion of the direction opposite to that of the electrode assembly accommodating portion 210, e.g., a portion away from the electrode assembly accommodating portion 210. For example, a space between the second and fourth areas 200Ab and 200Bb may be a pocket portion 200C in which air and the electrolyte, exhausted from the electrode assembly accommodating portion 210, may be stored.

After the first thermal bonding process is performed, an aging process may be performed so that the electrode assembly 100 may be sufficiently immersed in the electrolyte. Air may be exhausted from the electrode assembly accommodating portion 210 through the aging process. The air may be collected in the pocket portion 200C. In addition, a surplus electrolyte in the electrolyte may also be collected in the pocket portion 200C.

After the aging process is performed, a second thermal bonding process may be performed. The second thermal bonding process may thermally bond the bonding portion 230 (that was not thermally bonded between the first and third areas 200Aa and 200Ba during the first thermal bonding process). Thus, the electrode assembly accommodating portion 210 may be sealed.

Figure 13:
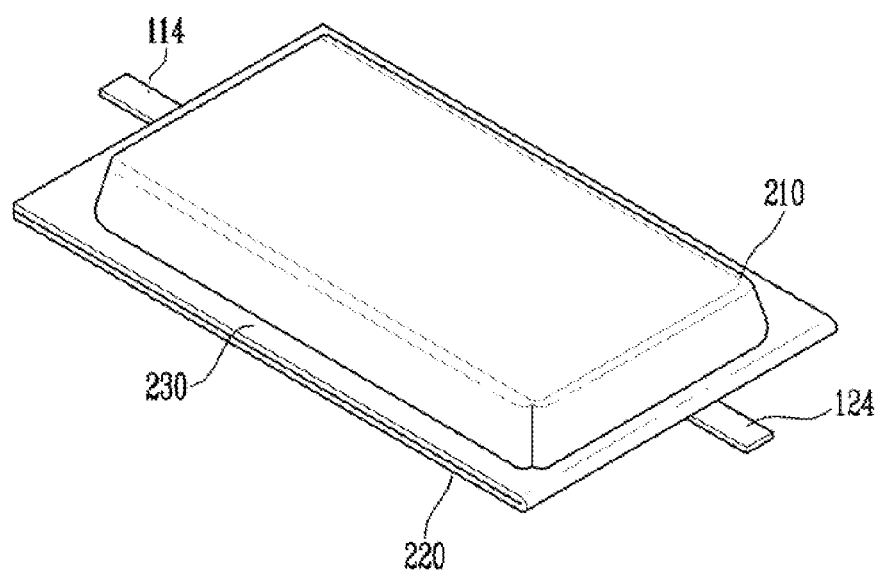

Referring to FIG. 13, after the second thermal bonding process is performed, the second and fourth areas 200Ab and 200Bb may be cut and removed, thereby manufacturing the secondary battery. In the battery case 200, the first and second electrode tabs 114 and 124 may be disposed in parallel with the boundary line BL, and maybe exposed in directions opposite to each other, e.g., may protrude from opposite sides of the secondary battery.

Hereinafter, another embodiment will be described with reference to FIGS. 14 to 16. Here, components that are identical to those of the aforementioned embodiment shown in FIGS. 1 to 13 are designated by like reference numerals, and repeated detailed descriptions thereof may be omitted to avoid redundancy. In the present embodiment, shown in FIGS. 14 to 16, differences from the aforementioned embodiment may be mainly described below.

Figure 14:
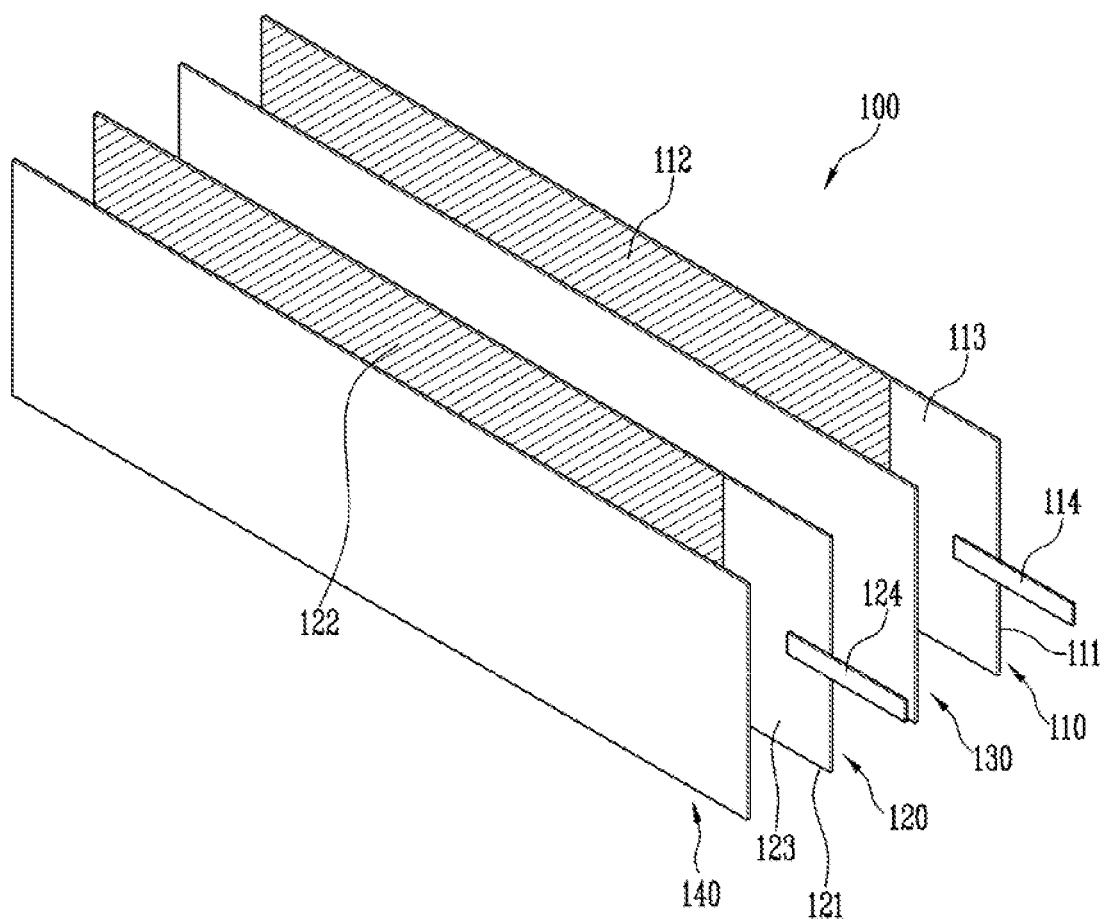
FIG. 14 illustrates an exploded perspective view of an electrode assembly according to another embodiment.

FIG. 14 illustrates an exploded perspective view of an electrode assembly according to another embodiment. FIG. 15 illustrates a conceptual view of a winding method of the electrode assembly shown in FIG. 14. FIG. 16 illustrates a perspective view of a state after the electrode assembly shown in FIG. 14 is wound.

Figure 15:
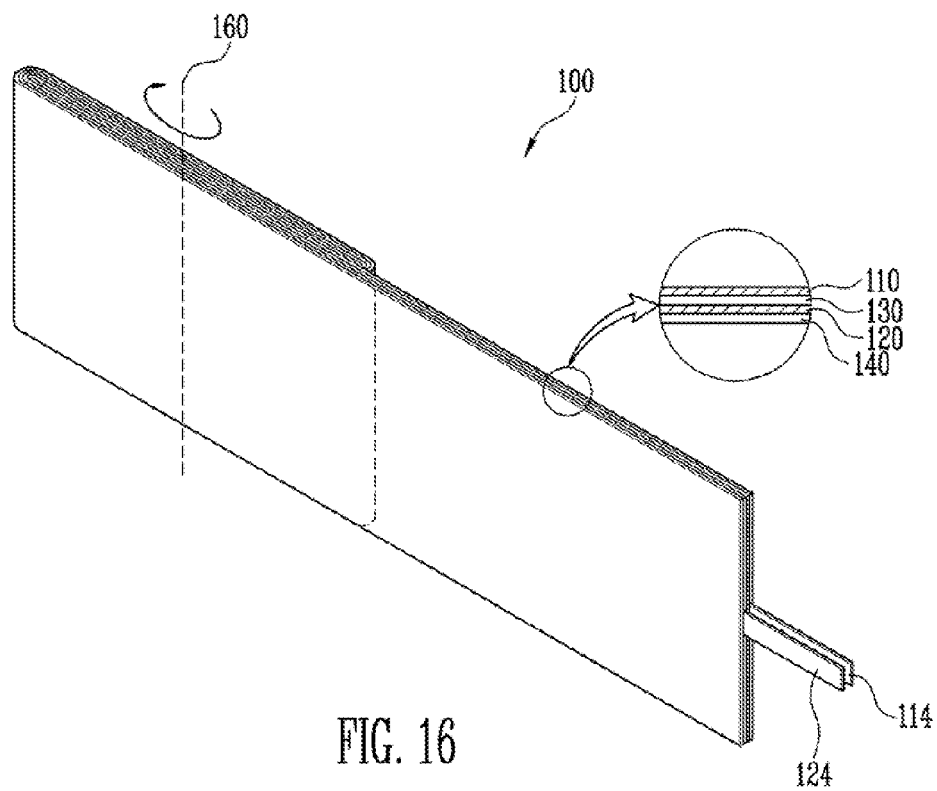
FIG. 15 illustrates a conceptual view of a winding method of the electrode assembly shown in FIG. 14.
Figure 16:
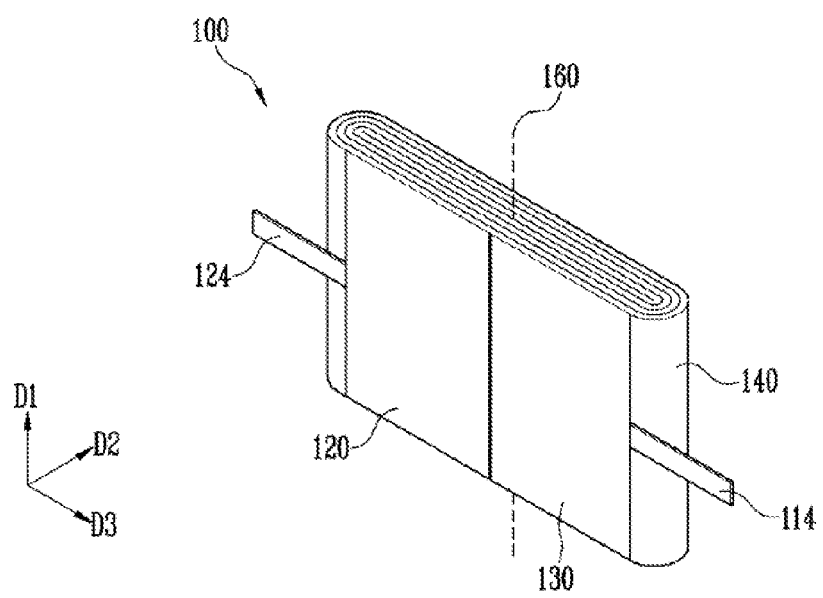
FIG. 16 illustrates a perspective view of a state after the electrode assembly shown in FIG. 14 is wound.

Referring to FIGS. 14 to 16, the electrode assembly 100 may include a first electrode plate 110, a second electrode plate 120, a first separator 130, and a second separator 140. One of the first and second electrode plates 110 and 120 may be a positive electrode plate, and the other of the first and second electrode plates 110 and 120 may be a negative electrode plate. For example, the first electrode plate 110 may have a polarity that is opposite to that of the second electrode plate 120. In the present embodiment, the first electrode plate 110 may be a positive electrode plate and the second electrode plate 120 may be a negative electrode plate, as an example.

The first electrode plate 110 may include a first electrode collector 111 (on which a first active material is coated), and a first electrode tab 114 (protruding in parallel with a lengthwise direction of the first electrode collector 111). In an implementation, the first electrode collector 111 may include a first active material portion 112 (e.g., an area of the first electrode collector 111 where the first active material is coated), and a first non-coating portion 113 (e.g., a remaining area of the first electrode collector 111 except for or other than the area of the first electrode collector 111 that includes the first active material portion 112).

The second electrode plate 120 may include a second electrode collector 121 (on which a second active material is coated), and a second electrode tab 124 (protruding in parallel with a lengthwise direction of the second electrode collector 121). In an implementation, the second electrode collector 121 may include a second active material portion 122 (e.g., an area of the second electrode collector 121 where the second active material is coated), and a second non-coating portion 123 (e.g., a remaining area of the second electrode collector 121 except for or other than the area of the second electrode collector 121 that includes the second active material portion 122).

One of the first and second separators 130 and 140, e.g., the first separator 130, may be between the first and second electrode plates 110 and 120. The other of the first and second separators 130 and 140 may be at an outside of the first and second electrode plates 110 and 120. For example, the second separator 140 may be disposed at the outside of the second electrode plate 120.

The electrode assembly 100 may be manufactured by winding the first electrode plate 110, the first separator 130, the second electrode plate 120, and the second separator 140 (with a predetermined width) about a winding axis 160.

The first and second electrode tabs 114 and 124 (of the first and second electrode plates 110 and 120) may be respectively exposed to outsides through the outermost edges of the electrode assembly 100, and may extend in parallel with a wound direction of the electrode assembly 100. The first and second electrode tabs 114 and 124 may protrude in directions opposite to each other.

Lengths of the first and second electrode plates 110 and 120 may be substantially equal or about equal to each other. After the electrode assembly 100 is wound, a winding end of an outermost electrode plate of the first and second electrode plates 110 and 120, e.g., the winding end of the second electrode plate 120, may be folded back in a direction opposite to the winding direction. Therefore, the first and second electrode tabs 114 and 124 may protrude in directions opposite to each other. For example, the first and second electrode tabs 114 and 124 from a same side or on a same surface of the electrode assembly 100.

Lengths of the first and second separators 130 and 140 may be substantially equal or about equal to each other. Lengths of the first and second separators 130 and 140 may be substantially equal or about equal to those of the first and second electrode plates 110 and 120.

An insulating tape (not shown) may be disposed on a surface of a folded area of the second electrode plate 120. When the electrode assembly 100 is accommodated in a battery case, the insulating tape may help reduce the likelihood and/or prevent the occurrence of a short circuit between the second electrode plate 120 and the battery case.

By way of summation and review, shapes of the mobile devices may be diverse and varied. Accordingly, the secondary batteries as power supply sources of the mobile devices may correspond to the various shapes of the mobile devices.

The embodiments may provide an electrode assembly that is bent in a streamlined shape.

The embodiments may provide an electrode assembly that has a section bent in a streamlined shape or a bent surface so as to correspond to various shapes of mobile devices.

As described above, a section of the electrode assembly may have a bent surface after being wound. Thus, the section of the secondary battery having the electrode assembly may also have a bent surface.

Further, when the secondary battery is mounted to a mobile device having a curved shape, it is possible to efficiently use an internal space of the mobile device. Thus, it is possible to easily implement the miniaturization and lightweight of the mobile device.

Further, when the secondary battery is mounted to an electronic device to be exactly fitted to the external appearance of the electronic device, the secondary battery may not easily be moved due to external impact, thereby improving the stability of the secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrode assembly, comprising:
   a first electrode plate, the first electrode plate including:
      a first electrode collector on which a first active material is coated, and
      a first electrode tab protruding in parallel with a lengthwise direction of the first electrode collector;
   a second electrode plate, the second electrode plate including:
      a second electrode collector on which a second active material is coated, and
      a second electrode tab protruding in parallel with a lengthwise direction of the second electrode collector;
   a first separator between the first and second electrode plates; and
   a second separator at an outside of the second electrode plate,
   wherein the first and second electrode tabs protrude in directions opposite to each other perpendicular to a winding axis.

2. The electrode assembly as claimed in claim 1, wherein a length of the first electrode plate is different from a length of the second electrode plate.

3. The electrode assembly as claimed in claim 2, wherein a winding amount of the first electrode plate is greater by a half cycle than that of the second electrode plate.

4. The electrode assembly as claimed in claim 3, wherein a length of the first separator is different from a length of the second separator.

5. The electrode assembly as claimed in claim 4, wherein a winding amount of the first separator is greater by a half cycle than that of the second separator.

6. The electrode assembly as claimed in claim 4, wherein:
   the winding amount of the first electrode plate is about equal to that of the first separator, and
   the winding amount of the second electrode plate is about equal to that of the second separator.

7. The electrode assembly as claimed in claim 1, wherein:
   the first electrode collector includes:
      a first active material portion that is an area of the first electrode collector where the first active material is coated, and
      a first non-coating portion that is a remaining area of the first electrode collector other than the first active material portion, and
   the second electrode collector includes:
      a second active material portion that is an area of the second electrode collector where the second active material is coated, and
      a second non-coating portion that is a remaining area of the second electrode collector other than the second active material portion.

8. The electrode assembly as claimed in claim 1, wherein lengths of the first and second electrode plates are about equal to each other.

9. The electrode assembly as claimed in claim 8, wherein a winding end of an outermost electrode plate of the first and second electrode plates is folded back in a direction opposite to a winding direction.

10. A secondary battery, comprising:
    an electrode assembly; and
    a battery case accommodating the electrode assembly therein,
    wherein the electrode assembly includes:
    a first electrode plate, the first electrode plate including:
       a first electrode collector on which a first active material is coated, and
       a first electrode tab protruding in parallel with a lengthwise direction of the first electrode collector;
    a second electrode plate, the second electrode plate including:
       a second electrode collector on which a second active material is coated, and a second electrode tab protruding in parallel with a lengthwise direction of the second electrode collector;
a first separator between the first and second electrode plates; and
a second separator at an outside of the second electrode plate, and
wherein the first and second electrode tabs protrude in directions opposite to each other perpendicular to a winding axis.

11. The secondary battery as claimed in claim 10, wherein a length of the first electrode plate is different from a length of the second electrode plate.

12. The secondary battery as claimed in claim 11, wherein a winding amount of the first electrode plate is greater by a half cycle than that of the second electrode plate.

13. The secondary battery as claimed in claim 12, wherein a length of the first separator is different from a length of the second separator.

14. The secondary battery as claimed in claim 13, wherein a winding amount of the first separator is greater by a half cycle than that of the second separator.

15. The secondary battery as claimed in claim 13, wherein:
the winding amount of the first electrode plate is about equal to that of the first separator, and
the winding amount of the second electrode plate is about equal to that of the second separator.

16. The secondary battery as claimed in claim 10, wherein:
the first electrode collector includes:
a first active material portion that is an area of the first electrode collector where the first active material is coated, and
a first non-coating portion that is a remaining area of the first electrode collector other than the first active material portion, and
the second electrode collector includes:
a second active material portion that is an area of the first electrode collector where the second active material is coated, and
a second non-coating portion that is a remaining area of the first electrode collector other than the second active material portion.

17. The secondary battery as claimed in claim 10, wherein lengths of the first and second electrode plates are about equal to each other.

18. The secondary battery as claimed in claim 17, wherein a winding end of an outermost electrode plate of the first and second electrode plates is folded back in a direction opposite to a winding direction.

19. The secondary battery as claimed in claim 10, wherein a section of the electrode assembly that is perpendicular to the winding axis of the electrode assembly has a bent surface.

20. The secondary battery as claimed in claim 19, wherein the battery case includes:
an electrode assembly accommodating portion that accommodates the electrode assembly therein;
an accommodating portion cover that covers the electrode assembly accommodating portion; and
a bonding portion that is bent at an upper end of the electrode assembly accommodating portion, the bonding portion being bonded to the accommodating portion cover.

* * * * *